C. E. GRIFFIN & T. MARSH.
Step for Spindle.
No. 53,813.
Patented April 10, 1866.
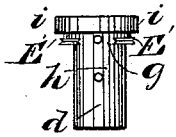
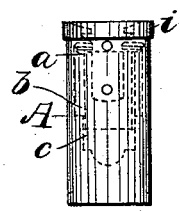 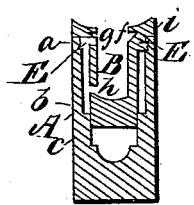
Witnesses:
John D. Thurston
William W. Rickard
Inventor:
Charles E. Griffin
Thomas Marsh

UNITED STATES PATENT OFFICE.

CHARLES E. GRIFFIN AND THOMAS MARSH, OF SMITHFIELD, R. I.

IMPROVEMENT IN STEPS FOR SPINDLES.

Specification forming part of Letters Patent No. 53,813, dated April 10, 1866.

*To all whom it may concern:*

Be it known that we, CHARLES E. GRIFFIN and THOMAS MARSH, both of Central Falls, Smithfield, in the county of Providence and State of Rhode Island, have invented a new and useful Improvement in Steps for Spindles; and we do hereby declare that the following specification, taken in connection with the drawings making a part of the same, is a full, clear, and exact description thereof.

Figure 1 is a perspective view of the step proper. Fig. 2 is a view of the step and the oil-reservoir surrounding the same. Fig. 3 is a vertical section through the axis of the step and the reservoir.

In the accompanying drawings, A represents a cylindrical plug, which is intended to be fitted into a corresponding hole in the step-rail of the spinning-frame. Its axis is bored out to a suitable depth for receiving the step proper, Fig. 1; but the cylindrical space so made is not of the same diameter throughout, the portion from $a$ to $b$ being made of a larger diameter than that of the space from $b$ to $c$, which last-named space is at the same diameter as the stem $d$ of the step proper, Fig. 1, which is to enter therein. The inner surface of the space from $a$ to $b$ for a short distance from the top is provided with a screw thread, $e$, into which a corresponding thread, $e'$, cut upon a shoulder forming the upper part of the step, Fig. 1, is to be fitted.

The step, Fig. 1, may be made of brass or of any suitable material, and should be of sufficient length to furnish a good bearing to the spindle.

In addition to the grooved channel $f$, which has heretofore been used, there are two apertures or ducts, $g$ and $h$, the former leading from the channel $f$, and the latter through the side of the step near the bottom, which apertures connect the space B, into which the spindle is stepped, with the surrounding space $a\,b$, Fig. 3; and there is also provided a projecting flange, $i$, (the edge of which should be milled for greater convenience in screwing the step into place,) which serves to cover the joint made by the threads of the screw.

It is evident that when the step is properly adjusted, as shown in Figs. 2 and 3, it will be surrounded by the annular chamber $a\,b$. The advantage of this chamber is that it furnishes a reservoir for the collection of the oil, which, when applied to the step, has a tendency to ascend the revolving spindle until it reaches the groove $f$, where it collects and passes through the upper aperture, $g$, into the chamber, from whence it flows back again into the step through the lower aperture, $h$. Thus the oil is kept constantly circulating in sufficient quantity around the bearing without flooding, and will continue to lubricate the spindle so long as any remains in the chamber. A spindle provided with this step and annular reservoir will, if of the size shown in the drawings, need no attention for at least twelve months, and as the space B is exactly filled by the spindle and the chamber is closed at the top by the threads of the screw-plug $e$, as well as by the overlapping flange $i$, it is impossible for any dust or foreign matter floating in the air to become mixed with the oil.

Whenever the step has become worn from long use, it can be removed and another substituted in its place with the greatest facility; and although we have shown a separate plug, A, provided with the annular chamber, and which will be convenient in providing old spinning-frames with our improvement, new frames can be constructed with the reservoir made in the step-rail itself without difficulty.

What we claim as our invention, and desire to secure by Letters Patent, is—

The independent step for spindles B, in combination with a close oil-chamber, $a\,b$, substantially as described.

CHARLES E. GRIFFIN.
THOMAS MARSH.

Witnesses:
JOHN D. THURSTON,
WILLIAM W. RICKARD.